(12) United States Patent
Kurata

(10) Patent No.: US 10,146,112 B2
(45) Date of Patent: Dec. 4, 2018

(54) PROJECTING TYPE IMAGE DISPLAY APPARATUS INCLUDING LIGHT SOURCE CONTROL UNIT AND COOLING CONTROL UNIT

(71) Applicant: CANON KABUSHIKI KAISHA, Tokyo (JP)

(72) Inventor: Yuya Kurata, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/588,303

(22) Filed: May 5, 2017

(65) Prior Publication Data

US 2017/0242323 A1 Aug. 24, 2017

Related U.S. Application Data

(63) Continuation of application No. 14/338,625, filed on Jul. 23, 2014, now Pat. No. 9,746,754.

(30) Foreign Application Priority Data

Jul. 26, 2013 (JP) .................. 2013-155786

(51) Int. Cl.
*G03B 21/16* (2006.01)
*H04N 9/31* (2006.01)
*G03B 21/20* (2006.01)

(52) U.S. Cl.
CPC .......... *G03B 21/16* (2013.01); *G03B 21/2026* (2013.01); *G03B 21/2053* (2013.01); *H04N 9/3144* (2013.01); *H04N 9/3155* (2013.01)

(58) Field of Classification Search
CPC ............... G03B 21/16; G03B 21/2053; G03B 21/2086; H04N 9/3144
See application file for complete search history.

(56) References Cited

U.S. PATENT DOCUMENTS 7,448,759 B2 * 11/2008 Fukano ................. H04N 5/74
348/748
7,654,696 B2 * 2/2010 Pollmann-Retsch ........
H05B 41/2928
315/118

(Continued)

FOREIGN PATENT DOCUMENTS

JP    H04-081832 A    3/1992
JP    2001-005099 A    1/2001
(Continued)

*Primary Examiner* — Bao-Luan Le
(74) *Attorney, Agent, or Firm* — Canon U.S.A., Inc. IP Division

(57) ABSTRACT

An image display apparatus including a light source; a light source control unit configured to control electric power to be supplied to the light source; a light source cooling unit configured to cool the light source; a cooling control unit configured to control the light source cooling unit; an image display device; an illumination optical system configured to introduce light from the light source to the image display device, and a projecting optical system configured to project light modulated by the image display device. When the light source control unit receives a turn-off command, the light source control unit first lowers electric power to be supplied to the light source to a predetermined electric power lower than normal electric power to be supplied when the lamp is on, and then blocks the supply of the electric power to the light source, thereby turning the light source off.

12 Claims, 8 Drawing Sheets

(56) References Cited

U.S. PATENT DOCUMENTS

| | | | | |
|---|---|---|---|---|
| 7,737,387 B2* | 6/2010 | Hsu | ............... | G03B 21/16 250/205 |
| 7,866,826 B2* | 1/2011 | Kobayashi | ............... | G03B 21/16 353/52 |
| 7,874,685 B2* | 1/2011 | Miyazawa | ............... | G03B 21/14 353/122 |
| 8,008,872 B2* | 8/2011 | Tolle | ............... | H05B 41/2928 315/247 |
| 8,038,300 B2* | 10/2011 | Kobayashi | ............... | G03B 21/16 353/52 |
| 8,277,050 B2* | 10/2012 | Furumi | ............... | G03B 21/16 353/121 |
| 2006/0012758 A1* | 1/2006 | Fukano | ............... | H04N 5/74 353/85 |
| 2006/0158125 A1* | 7/2006 | Pollmann-Retsch | ............... | H05B 41/2928 315/106 |
| 2007/0109504 A1* | 5/2007 | Miyazawa | ............... | G03B 21/14 353/67 |
| 2008/0030689 A1* | 2/2008 | Hsu | ............... | G03B 21/16 353/57 |
| 2008/0316435 A1* | 12/2008 | Kobayashi | ............... | G03B 21/16 353/52 |
| 2009/0261756 A1* | 10/2009 | Tolle | ............... | H05B 41/2928 315/307 |
| 2011/0025987 A1* | 2/2011 | Furumi | ............... | G03B 21/16 353/57 |
| 2011/0069283 A1* | 3/2011 | Kobayashi | ............... | G03B 21/16 353/52 |

FOREIGN PATENT DOCUMENTS

| | | |
|---|---|---|
| JP | 2006-510174 A | 3/2006 |
| JP | 2006-154016 A | 6/2006 |
| JP | 2008-288019 A | 11/2008 |
| JP | 2011-033858 A | 2/2011 |

* cited by examiner

| SPECIFICATIONS | NUMBER OF TESTED LAMPS | NUMBER OF LAMPS BROKEN | MODE OF BREAKAGE AND NUMBER OF LAMPS BROKEN |
|---|---|---|---|
| RELATED ART | 7 | 4 | BREAKAGE: 3 OTHERS: 1 |
| INVENTION | 7 | 0 | -- |

PROJECTING TYPE IMAGE DISPLAY APPARATUS INCLUDING LIGHT SOURCE CONTROL UNIT AND COOLING CONTROL UNIT

CROSS-REFERENCE TO RELATED APPLICATIONS

This application is a continuation, and claims the benefit, of U.S. patent application Ser. No. 14/338,625 filed Jul. 23, 2014 (now U.S. Pat. No. 9,746,754), which claims the benefit of Japanese Patent Application No. 2013-155786 filed Jul. 26, 2013. Each of U.S. patent application Ser. No. 14/338,625 and Japanese Patent Application No. 2013-155786 is hereby incorporated by reference herein in its entirety.

BACKGROUND

Field

This disclosure relates to a method of cooling a lamp, which is a light source of a projecting type image display apparatus such as a liquid crystal projector or the like when the lamp is turned off.

Description of Related Art

In recent years, demand for a projecting type image display apparatus represented by a liquid crystal projector is rapidly increased. Among others, a tendency toward a high luminance is in rapid progress.

An ultra-high pressure mercury lamp is mainly used as a light source of the projecting type image display apparatus, and the ultra-high pressure mercury lamp generally has electric power of several hundred watts and a gap between electrodes of 1 mm or smaller. Therefore, a current of several amperes flows between the electrodes, and electrons emitted therefrom collide with the electrodes, so that the electrodes get overheated. Consequently, the temperature of distal ends of the electrodes rises to a level on the order or 3000° C., and the temperature in the interior of a bulb formed of quartz glass exceeds 1000° C. The pressure in the interior of the quartz glass is increased to 20 MPa (200 atmospheric pressure) or higher. Therefore, it is important to cool the temperature of the interior of the bulb to an adequate temperature by flowing a cold air thereon from the outside.

In addition, since a heat source of several hundred watts which has been supplied to the ultra-high pressure mercury lamp when the lamp is on becomes zero when the lamp is turned off, the temperature of the quartz glass bulb is rapidly lowered. At this time, a temperature difference between an inner surface and an outer surface of the bulb causes a difference in time of arrival at a point of distortion of the quartz glass, whereby a distortion is generated within the quartz glass. In order to reduce the distortion, a decrease in speed of reduction in temperature of the quartz glass after the lamp is turned off is considered to be effective.

Examples of the decrease in speed of reduction in temperature after the lamp has turned off are disclosed in U.S. Pat. No. 6,788,009 and Japanese Patent No. 4081684.

In U.S. Pat. No. 6,788,009, a configuration in which the lamp is turned off in such a manner that electric power of a lamp is lowered to an extent that an arc discharge is not disappeared (½ to ½₀) when the lamp is turned off, then is maintained for a certain period, and then is turned off is disclosed.

The configuration disclosed in U.S. Pat. No. 6,788,009 produces an effect for making a cooling gradient of the bulb gentle when the lamp is turned off. However, by lowering electric power significantly, adhesion of electrode materials to a bulb tube wall or extinction of the lamp may occur, and hence there is a probability of occurrence of another problem that a lifetime of an ultra-high pressure mercury lamp is shortened.

Japanese Patent No. 4081684 discloses a configuration in which a fan that cools the lamp is stopped when the lamp is turned off.

In Japanese Patent No. 4081684, even though a cooling fan is stopped and a decrease in cooling speed is achieved when the lamp is turned off, the calorific power is significantly reduced (disappeared) by turning off of the lamp, and hence the cooling speed cannot be decreased so much.

SUMMARY

This disclosure provides a projecting type image display apparatus including a light source; a light source control unit configured to control electric power to be supplied to the light source; an image display device; and an illumination optical system configured to guide light from the light source to the image display device. When the light source control unit receives a turn-off command, the light source control unit first lowers electric power to be supplied to the light source to a predetermined electric power lower than normal electric power to be supplied when the lamp is on, and then blocks the supply of the electric power to the light source, thereby turning the light source off.

Further features of the present invention will become apparent from the following description of exemplary embodiments with reference to the attached drawings.

DETAILED DESCRIPTION

Figure 1:
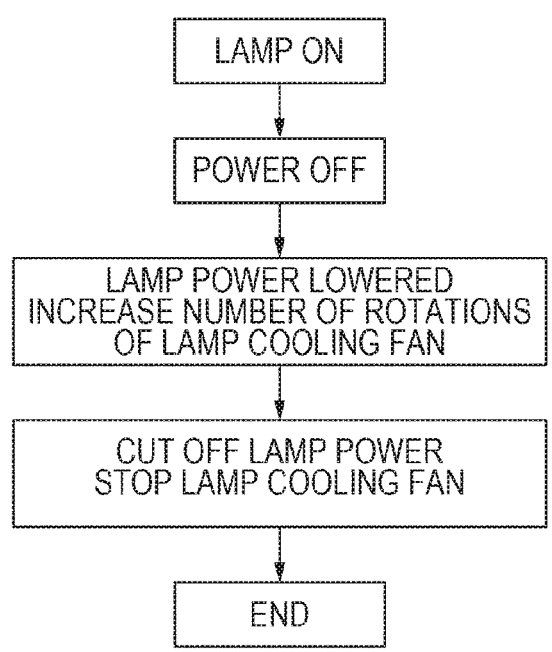
FIG. 1 is a flowchart of control of electric power of a lamp and a lamp cooling fan when the lamp is turned off, as in Example 1.

Referring now to the drawings, detailed examples of this disclosure will be described.

Accordingly, it is an object of this disclosure to provide a projecting type image display apparatus configured to be capable of elongating a lifetime of a lamp.

EXAMPLE 1

Figure 2:
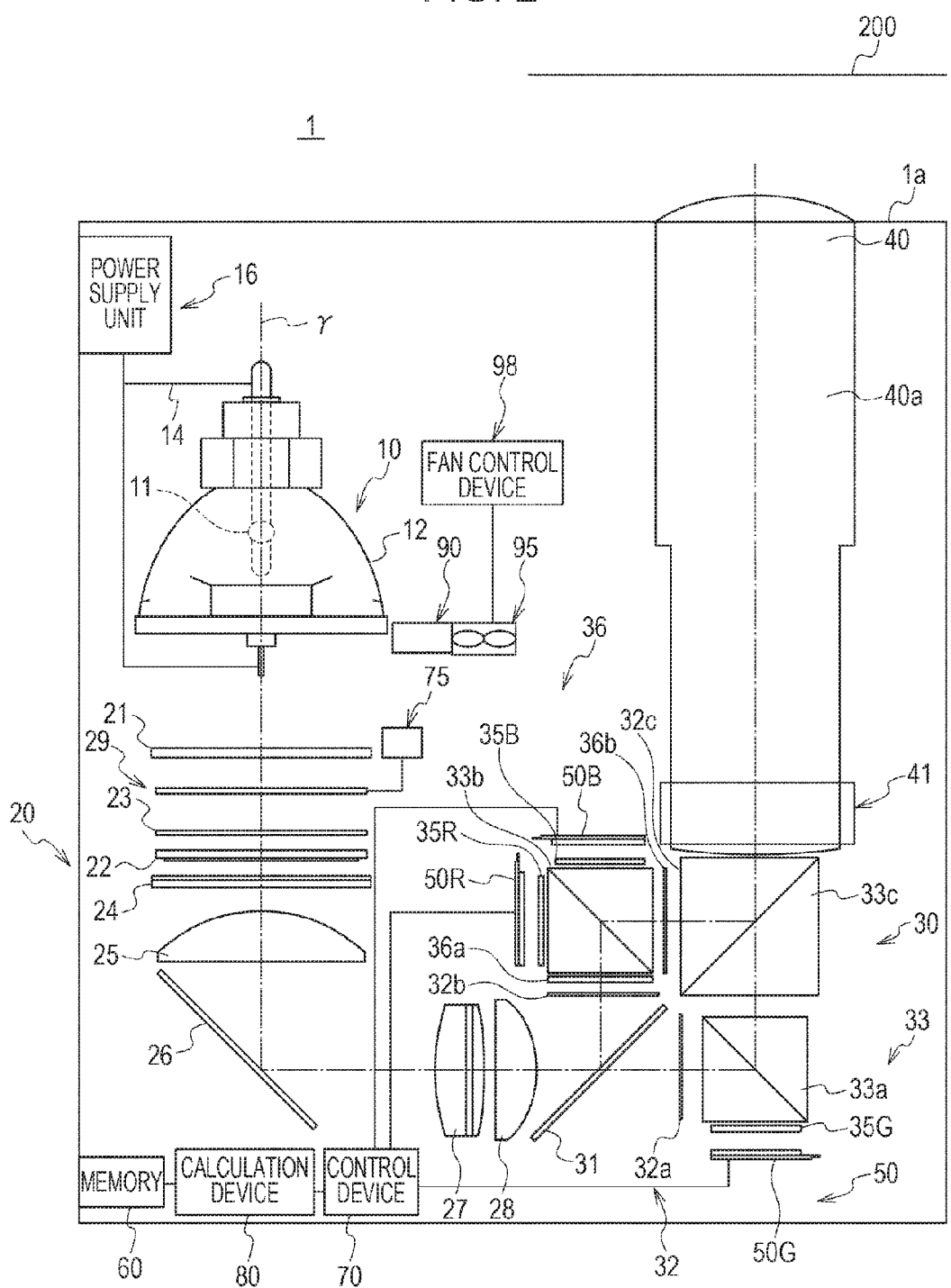
FIG. 2 is a configuration drawing of a projecting type image display apparatus of Example 1.

Referring now to the attached drawings, a liquid crystal display apparatus (image display apparatus) 1, which is an example of this disclosure, will be described. FIG. 2 is a configuration drawing illustrating the liquid crystal display apparatus 1.

The liquid crystal display apparatus 1 has a function to display an image on a screen 200. The liquid crystal display apparatus 1 in this example is a projecting type image display apparatus having a reflecting-type liquid crystal display device (an image display device such as the reflecting-type liquid crystal display device) mounted thereon. The liquid crystal display apparatus 1 includes: a housing 1a; a lamp 10; an illumination optical system 20; a color separating and combining optical system 30; a projection lens optical system 40; a liquid crystal display device (image display device) 50; a memory 60; a control device 70; and a calculating device 80.

The housing 1a fixes and stores a member that constitutes part of the liquid crystal display apparatus 1. The housing 1a is a square cube in this example. The housing 1a exposes part of the projection lens optical system 40 to the outside. The housing 1a includes, for example, an adjusting mechanism configured to adjust an inclination of the liquid crystal display apparatus 1. Part of the projection lens optical system 40 is exposed to the outside in this example, but may be stored in the housing 1a.

The lamp (light source apparatus) 10 has a function to generate light. The lamp 10 includes: a bulb (formed of glass) 11; a reflector 12; an electrode 13; a lead wire 14 configured to supply electric power to the electrode; and a connecting portion 15 configured to connect the electrode 13 and the lead wire 14. In this case, γ denotes an optical axis of the liquid crystal display apparatus 1. Here, the bulb 11 and the electrode 13 correspond to the light source, and a power supply unit (light source control unit) 16 supplies electric power to the electrode 13 via the lead wire 14. The power supply unit (light source control unit) 16 is capable of changing electric power to be supplied to the light source (electrode), and is capable of supplying electric power lower than electric power (normal electric power) to be supplied at the time of normal image display. In the case where electric power to be supplied to the light source at the time of normal image display is changed (including a case where the electric power supply is cut off), maximum electric power in the range of the change of electric power is defined as the normal electric power here.

The bulb 11 has a function of emitting white light in a continuous spectrum. The bulb 11 is formed of quartz glass.

The reflector 12 has a function to condense light from the bulb 11 in a predetermined direction. Therefore, the reflector 12 is composed of a mirror or the like having a high reflection ratio, and has a semi-spherical shape.

The electrode 13 emits electrons from electric power supplied by the power supply unit 16 via the lead wire 14.

With the electrons emitted from the electrode 13, the lamp radiates light.

The lamp 10, when turned on, causes a temperature rise of the entire lamp 10, especially of the bulb 11 by heat generated by electron collision with the electrode 13. If the lamp is continuously kept on, lowering of luminance caused by crystallization of glass due to the temperature rise of the bulb 11 or separation of the lead wire connecting portion 15 may result, so that the bulb 11 and the connecting portion 15 need to be cooled. Therefore, a lamp cooling fan 95 for supplying air to the lamp 10 and an air duct 90 for guiding the air from the lamp cooling fan 95 to the lamp 10 are arranged. The lamp cooling fan 95 controls the number of rotations by a lamp cooling fan control device 98.

Figure 3:
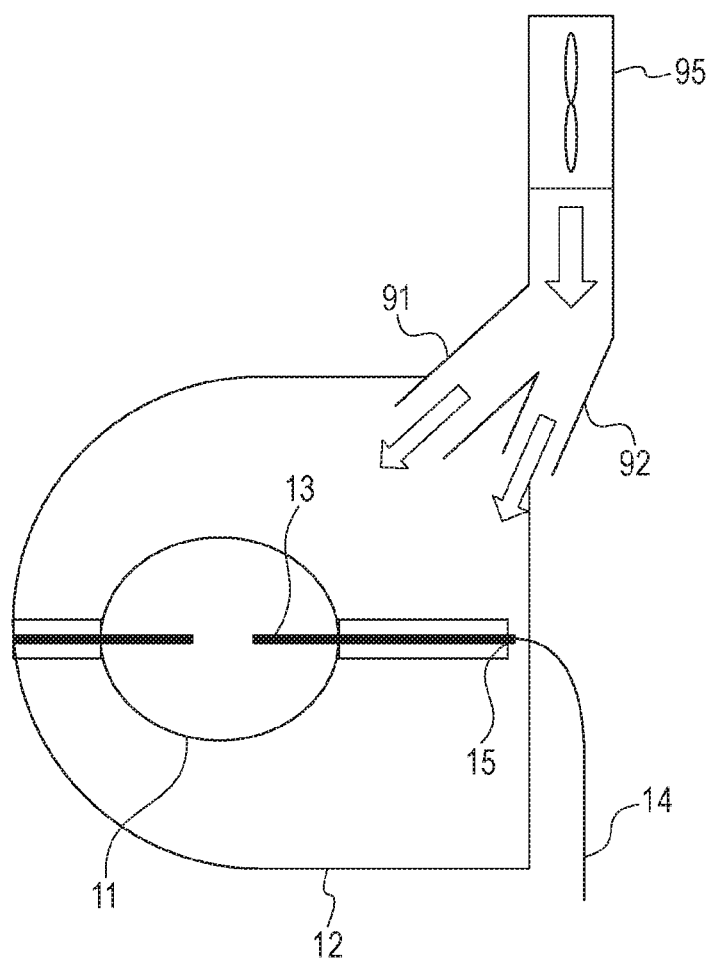
FIG. 3 illustrates a cooling configuration of the lamp of Example 1.

Subsequently, a configuration of the lamp cooling fan 95 and the air duct 90 when cooling the lamp 10 will be described with reference to FIG. 3.

The air duct 90 includes a bulb cooling air duct 91 and a connecting portion cooling air duct 92 so that the bulb 11 and the connecting portion 15 of the lamp 10 can be cooled independently.

The lamp cooling fan 95 also includes a bulb cooling fan 96 and a connecting portion cooling fan 97 so that the bulb 11 and the connecting portion 15 of the lamp 10 can be cooled independently.

The air from the bulb cooling fan 96 is blown to the bulb 11 through the bulb cooling air duct 91, and cools the bulb 11.

The air from the connecting portion cooling fan 97 is blown to the connecting portion 15 through the connecting portion cooling air duct 92, and cools the connecting portion 15.

Accordingly, the bulb 11 and the connecting portion 15 are cooled to adequate temperatures and hence the lifetime of the lamp 10 can be elongated.

The illumination optical system 20 has a function to transmit light from the lamp 10 to the color separating and combining optical system 30. The illumination optical system 20 includes cylinder arrays 21 and 22, a ultraviolet absorbing filter 23, a polarization conversion element 24, a front compressor 25, a totally reflecting mirror 26, a condenser lens 27, and a rear compressor 28.

The cylinder arrays 21 and 22 is a composite body of photosensitive devices integrated in a camera, a detector, a scanning apparatus, and the like. The cylinder array 21 is a lens array having a refracting power in a direction perpendicular to an optical axis γ. The cylinder array 22 includes a lens array corresponding to individual lenses of the cylinder array 21. In this example, the cylinder array 21 is arranged forward of the lamp 10, and the cylinder array 22 is arranged forward of the ultraviolet absorbing filter 23, described later.

The ultraviolet absorbing filter 23 has a function to absorb an ultraviolet ray. The ultraviolet absorbing filter 23 is arranged between the cylinder array 21 and the cylinder array 22.

The polarization conversion element 24 has a function to convert non-polarized light to predetermined polarized light. The polarization conversion element 24 is arranged forward of the cylinder array 22.

The front compressor 25 includes a cylindrical lens having a refracting power in the horizontal direction. The front compressor 25 is arranged forward of the polarization conversion element 24.

The totally reflecting mirror 26 has a function to reflect light from the lamp 10. The totally reflecting mirror 26 in this example converts the optical axis by 90 degrees. The totally reflecting mirror 26 is arranged forward of the front compressor 25.

The condenser lens 27 collects light from the lamp 10, and forms an image of the light sources in a pupil of an objective lens, whereby an object is uniformly illuminated. The condenser lens 27 is arranged forward of the totally reflecting mirror 26.

The rear compressor 28 includes a cylindrical lens having a refracting power in the horizontal direction. The rear compressor 28 is arranged forward of the condenser lens 27.

A light-shielding component 29 includes a reflecting mirror on a light incident side of the lamp 10. The light-shielding component 29 includes a component such as an aperture configured to cut off the light from the lamp 10 in a phased manner and a component such as a shutter configured to cut off the entire light from the lamp 10.

The light-shielding component 29 performs control to cut off light from the lamp 10 by a light-shielding component control device 75.

The color separating and combining optical system 30 has a function to resolve and combine light from the lamp 10. The color separating and combining optical system 30 includes a dichroic mirror 31, a polarizing plate 32, a polarization beam splitter 33, a ¼ waveplate 35, and a color selection phase difference plate 36.

The dichroic mirror 31 reflects light having a wavelength regions of blue (B) and red (R), and transmits light having a wavelength region of green (G). The dichroic mirror 31 is arranged on a front surface of the rear compressor 28.

The polarizing plate 32 has a function to let only S polarized light to transmit therethrough. The polarizing plate 32 includes polarizing plates 32a, 32b, and 32c. The polarizing plate 32a is a light incident side polarizing plate for green having a transparent substrate and a polarizing element adhere to each other, and is configured to transmit only S-polarized light. The polarizing plate 32a is arranged forward of the dichroic mirror 31. The polarizing plate 32b is a light incident side polarizing plate for red and blue having a transparent substrate and a polarizing element adhere to each other, and is configured to transmit only S-polarized light. The polarizing plate 32b is arranged forward of the dichroic mirror 31. The polarizing plate 32c is a light outgoing side polarizing plate (polarizing element) for red and blue having a transparent substrate and a polarizing element adhere to each other, and is configured to transmit only S-polarized light.

The polarization beam splitter 33 transmits P-polarized light and reflects S-polarized light. The polarization beam splitter 33 includes a polarization split surface. The polarization beam splitter 33 includes the polarization beam splitters 33a, 33b and 33c. The polarization beam splitter 33a transmits P-polarized light and reflects S-polarized light. The polarization beam splitter 33a is arranged on a front surface of the polarizing plate 32a. The polarization beam splitter 33b transmits P-polarized light and reflects S-polarized light. The polarization beam splitter 33b is arranged on a front surface of a color selection phase difference plate 36a. The polarization beam splitter 33c transmits P-polarized light and reflects S-polarized light. The polarization beam splitter 33c is arranged on a front surface of the polarization beam splitter 33a.

The ¼ waveplate 35 has a function to provide a phase difference. The ¼ waveplate 35 includes ¼ waveplates 35R, 35G, and 35B. The ¼ waveplate 35R is arranged between the polarization beam splitter 33b and the liquid crystal display element 50R. The ¼ waveplate 35G is arranged between the polarization beam splitter 33a and the liquid crystal display element 50G. The ¼ waveplate 35B is arranged between the polarization beam splitter 33b and the liquid crystal display element 50B.

The color selection phase difference plate 36 has a function to convert a polarizing direction of specific light by 90 degrees. The color selection phase difference plate 36a converts a polarizing direction of blue light by 90 degrees, and does not change a polarizing direction of red light. The color selection phase difference plate 36a is arranged between the polarizing plate 32b and the polarization beam splitter 33b. The color selection phase difference plate 36b converts the polarizing direction of red light by 90 degrees, and does not change the polarizing direction of blue light. The color selection phase difference plate 36b is arranged between the polarizing plate 32c and the polarization beam splitter 33b.

Figure 10:
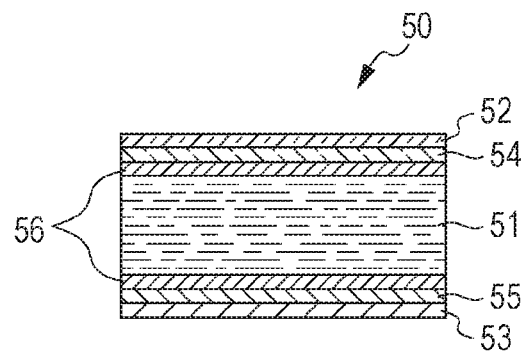
FIG. 10 illustrates an example reflecting-type liquid crystal display device.

FIG. 10 is a configuration drawing illustrating the reflecting-type liquid crystal display device. The reflecting-type liquid crystal display device 50 is manufactured by encapsulating a liquid crystal layer 51 between a glass substrate 52 and a Si substrate 53. The glass substrate 52 includes a transparent electrode 54 arranged thereon. The Si substrate 53 includes a semiconductor circuit for driving the reflecting-type liquid crystal display device 50, and includes a reflecting electrode 55 arranged on a front surface thereof. The glass substrate 52 and the Si substrate 53 each include an alignment film 56 for arranging liquid crystal molecules on a surface coming into contact with the liquid crystal layer 51. The transparent electrode 54 is an ITO electrode, and the reflecting electrode 55 is an electrode containing Al as a main component. The alignment film 56 is a film for aligning the liquid crystal molecules in a perpendicular direction, and is formed by exposing an inorganic alignment film to oblique evaporation of $SiO_2$ or rubbing a polyimide film or the like. A liquid crystal material having dielectric constant anisotropy is used as the liquid crystal material of the liquid crystal layer 51. Here, the reflecting-type liquid crystal display device is employed. However, this disclosure is not limited thereto, and transmissive liquid crystal display device, a micro mirror device, or other image display device (light modulation device) may be used.

A thickness of the liquid crystal layer 51 of the reflecting-type liquid crystal display device 50 is defined as d (μm). The thickness of the liquid crystal layer 51 is controlled by a spacer, which is not illustrated.

Refractive index anisotropy of the liquid crystal material is defined as Δn. The refractive index anisotropy is given by a difference between a refractive index ne in a long axis direction and a refractive index no in a mono-axis direction. The value of the refractive index has a wavelength dispersing property, and has a specific value for each wavelength.

By changing the direction of the liquid crystal material existing on the liquid crystal layer 51 by applying a voltage between the transparent electrode 54 and the reflecting electrode 55, the refractive index anisotropy Δn is changed, and the phase difference may be applied to the polarized incident light. Light which has a phase difference and is different from an incident polarizing axis is guided to the projection lens optical system 40 and projected by the polarization beam splitter 33 selectively transmitted or reflected. In contrast, light which has a phase difference and having the same polarizing axis as the incident polarizing axis returns back toward the lamp 10 by selectively reflected by or transmitted through the polarization beam splitter 33 in contrast to the case described above.

The projection lens optical system (projecting device) 40 radiates light from the lamp 10 via the illumination optical system 20 and the color separating and combining optical system 30. The projection lens optical system 40 includes a lens barrel 40a and a plurality of optical devices which are not illustrated. The projection lens optical system 40 includes a shift mechanism 41 capable of shifting a projected image on the screen 200.

In the liquid crystal display apparatus 1, the lamp 10 receives a supply of electric power by the power supply unit 16 when the lamp is on, and the image projected on the screen 200 may be observed.

When an action to turn the power source off is performed (a turn-off operation member is operated, a power button is turned off, or a turn-off command is issued in association with these operations) after a predetermined object has achieved, a sequence illustrated in FIG. 1 is executed. In other words, the power supply unit (light source control unit) 16 receives the turn-off command on the basis of the operation performed by the user, a timer action, or the like, and a turn-off operation (a turn off sequence) is started after the reception of the turn-off command. A sequence described below may be mounted as a method of controlling the liquid crystal display apparatus (image display apparatus), or may be mounted on the liquid crystal display apparatus (image display apparatus) as a control program.

First of all, electric power that the power supply unit 16 supplies the lamp 10 to a level of 80% the rating. The term "rating" here corresponds to the above-described normal electric power, and is electric power supplied to the lamp 10 when the image is displayed. Although the electric power is lowered to 80% the rating, any percentages not smaller than 50% and smaller than 100% are acceptable. More preferably, a further gentle temperature gradient can easily be formed by the rating not smaller than 60% and smaller than 90%.

At the same time, the number of rotations of the lamp cooling fan 95 is controlled to be increased by the fan control device (cooling control unit) 98. (STEP 1) Here, electric power not lower than 1.3 times and not higher than 5 times the electric power that the fan control device (cooling control unit) 98 supplies to the lamp cooling fan (light source cooling unit) 95 is preferably supplied to the lamp cooling fan 95 when the lamp is turned off at the time of normal image display.

After this state has been maintained for 10 seconds (at least 1 second, if possible 3 seconds or more), the power supply unit 16 is caused to cut off the electric power supplied to the lamp 10. The term "this state" means the state in which the supply power to the lamp is lowered to a lever lower than the rated electric power (normal electric power). In other words, the term "this state" may mean a state in which the supply power to the lamp is changed (lowered) as long as being lower than the rated electric power. What is essential is that the supply power is adjusted so that avoidance generation of a significant temperature distribution in quartz glass whereof bulb 11 of the lamp is formed, and cooling the bulb 11 quickly are both achieved simultaneously. In the case of decreasing the supply power to the lamp on the basis of a distortion point of a material whereof the bulb is formed and the temperature of the lam when the rated electric power is supplied, the speed of decrease is determined. In the case of maintaining the electric power to a certain value as an electric power to be reduced, the value to be maintained may be determined on the basis of the distortion point and the temperature of the lamp at the time of electric power supply.

Figures 4, 5:
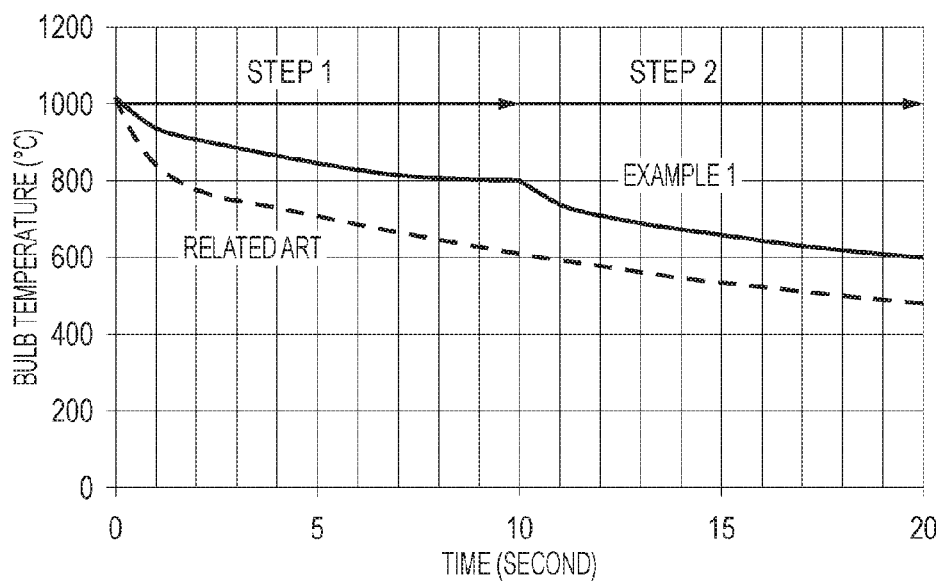
FIG. 4 illustrates a change in bulb temperature when the lamp is turned off in Example 1.
FIG. 5 illustrates a result of a reliability test of the lamp of Example 1.

Subsequently, control is performed to stop the rotation of the lamp cooling fan 95 by the fan control device 98 (almost) at the same time as cut-off of the electric power supply to the lamp. (STEP 2) By using the sequence described above, it was found that the temperature of the bulb 11 when the lamp is turned off decreased gently as illustrated in FIG. 4. It is effective to set the temperature gradient so that the cooling gradient to 1125° C., which is the distortion point (temperature at the distortion point) of quartz glass as the material of the bulb, becomes gentle. By setting the cooling gradient to the distortion point to be not larger than 20° C./s (20 degrees/second), more preferably to be not larger than 10° C./s, the distortion of the bulb 11 can be reduced. In other words, the temperature of the bulb can be lowered to a point not higher than the distortion point of quartz glass whereof the bulb is formed (a point not higher than the distortion point temperature) at a gentle cooling gradient (the temperature gradient). The cooling gradient in this case (the temperature gradient, the temperature lowering gradient) corresponds to an absolute value of the temperature gradient of the lamp 10 (specifically, portion of the bulb 11) from a moment when the turn-off operation of the lamp 10 is started (upon operation of the turn-off operation member and issue of the turn-off command is issued) until the electric power supply to the lamp 10 is cut off.

Here, a timing at which the supply power to the lamp fan (light source control unit) 95 is to be increased is preferably at the same timing as or earlier than lowering of the supply power from the power supply unit (light source control unit) 16 to the lamp 10. Timing at which the supply power to the lamp cooling fan (light source cooling unit) 95 is to be cut off is preferably earlier than or at the same timing as the cut-off of the supply power from the power supply unit (light source control unit) 16 to the lamp 10. However, in the case where the temperature is lower than the distortion point of quartz glass already, it is preferable that the power supply to the lamp cooling fan 95 is continued and cooling to the room temperature is quickly cooled.

Here, the temperature in the graph in FIG. 4 represents an outer surface temperature of the bulb 11. A main heat source of the bulb 11 is the electrode 13 in the interior of the lamp 10, and the temperature of the inner surface and the temperature of the outer surface are significantly different. When considering in terms of a heat transmissivity, the temperature difference on the inner surface and the outer surface of the bulb 11 falls between 200 to 400° C., and the inner surface temperature of the bulb 11 is higher than the outer surface temperature of the bulb 11 by an amount corresponding to the temperature difference. Therefore, when considering the temperature with the outer surface temperature of the bulb 11 as a reference, it is preferable to cool slowly to temperatures on the order of 700 to 900° C. The lamp 10 used in this example, since he temperature difference between the inner surface and the outer surface of the bulb 11 is on the order of 300° C. due to the thickness of the quartz glass. Therefore, the lamp 10 is configured to cut off the electric power of the lamp 10 and to be put off after the temperature on the outer surface of the bulb 11 has reached 800° C.

In order to achieve the gentle temperature, the electric power is reduced and the supply power to the lamp cooling fan 95 is increased for several seconds (1 second or more) before cutting off the electric power supply from the power supply unit (light source control unit) 16 to the lamp 10. However, it is not necessary to execute both operations described above. Since the temperature gradient is reduced only by reducing the supply power from the power supply unit 16 to the lamp 10, only reducing the supply power gradually is also acceptable.

In order to confirm the effect of this disclosure, a lighting test is actually conducted to compare the rate of occurrence of failure of the lamp 10 is performed. For comparison, the test was conducted both in a case where the turning-off sequence in FIG. 1 is introduced, and in a case where the lamp 10 is turned off when turning the electric power off and the lamp cooling fan 95 is continuously rotated, which is a general case as the related art. This is a generally introduced system in the case where an ultra-high pressure mercury lamp is used in the projecting type image display apparatus 1 for making the apparatus easy to carry in a short time by increasing the number of rotations of the fan attached to the product and reducing the temperature of the product when the power source is turned off. The test method includes repeating turning the lamp 10 on and off in each turn-off sequence, and confirming the state of the lamp 10 after predetermined time has elapsed. The result of the test is shown in FIG. 5. As is clear from the result of the test, rupture of the lamp 10 has occurred after the lamp 10 has kept on for a certain period in the case of the turn-off sequence of the related art, while breakage of the lamp 10 in the same period becomes zero and breakage of the lamp 10 is restrained by introducing the sequence of this disclosure.

From the result described above, it seems that probability of occurrence of the breakage of the lamp 10 is reduced by reducing a thermal stress generated in the bulb 11 when the lamp is turned off by optimizing the sequence when the lamp 10 is turned off and making the temperature gradient to the distortion point of quartz glass gentle.

In this disclosure, the test in which the electric power supplied to the lamp 10 is reduced to 80% has been conducted, this disclosure is not limited to this electric power, and the effect can be obtained also by switching to other electric powers. However, when the electric power is reduced to be lower than 50%, mercury encapsulated in the electrode 13 or the bulb 11 is adhered to the inner surface of the bulb 11, so that lifetime property of the lamp 10 may be affected. Therefore, a power set value (electric power when the supply power is reduced) is preferably not less than 50%, more preferably not less than 60% (less than 90%) as described above.

In this disclosure, control is performed in such a manner that the electric power to be supplied to the lamp 10 is lowered to 80%, and the number of rotations of the lamp cooling fan 95 is increased by the fan control device 98. However, this disclosure is not limited thereto, and the effect of this disclosure is achieved by making the temperature until reaching the distortion point of quartz glass gentle without changing the number of rotations of the lamp cooling fan 95. The temperature gradient until reaching the distortion point of quartz glass is preferably not higher than 20° C./s, more preferably, not higher than 10° C./s, and electric power may be set to a value so as to achieve this temperature gradient.

EXAMPLE 2

Figure 6:
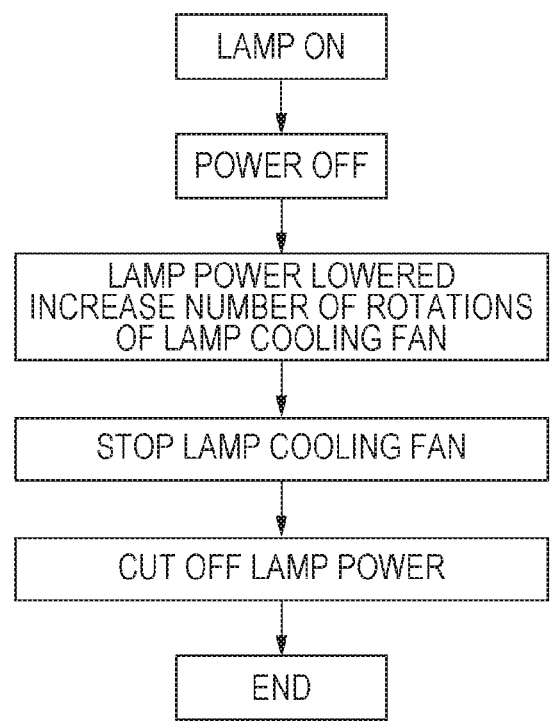
FIG. 6 is a flowchart of control of electric power of a lamp and a lamp cooling fan when the lamp is turned off, as in Example 2.

In the liquid crystal display apparatus 1, when a user performs an operation to turn the power source off, a sequence shown in FIG. 6 is performed. First of all, electric power supplied from the power supply unit 16 to the lamp 10 is lowered to 80% the rated power. Simultaneously, control to increase the number of rotations of the lamp cooling fan 95 by the fan control device 98 is performed. (STEP 1) Subsequently, control to stop the rotation of the lamp cooling fan 95 by the fan control device 98 is performed. (STEP 2) Electric power supplied from the power supply unit 16 to the lamp 10 is cut off. (STEP 3) By using this sequence, the lamp cooling fan 95 can be stopped completely before the lamp 10 is turned off. By introducing this sequence, the lamp cooling fan 95 is prevented from continuously rotating with inertia even though an attempt is made to perform control to stop the lamp cooling fan 95 by the fan control device 98 simultaneously with the turning-off of the lamp 10. Therefore, when the lamp 10 is turned off, air from the lamp cooling fan 95 does not hit on the lamp 10, so that the cooling gradient of the bulb 11 is prevented from becoming large. Consequently, probability of failure of the lamp 10 is further lowered.

Figure 7:
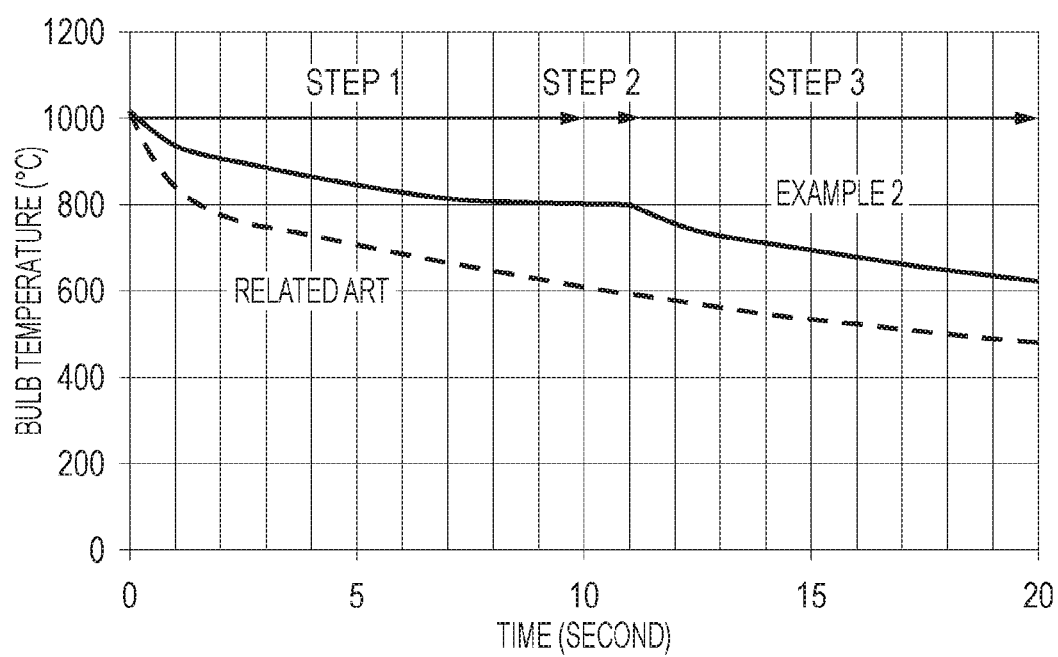
FIG. 7 illustrates a change in bulb temperature when the lamp is turned off in Example 2.

By introducing the turn-off sequence shown in FIG. 6, the temperature change of the lamp when the lamp is turned off can be made gentle as shown in FIG. 7. Consequently, the cooling gradient to the distortion point of the quartz glass can be made gentler, and the probability of failure of the lamp 10 can be reduced.

In this disclosure, the lamp cooling fan 95 is stopped by the fan control device 98, and one second after, the lamp 10 is turned off. However, this disclosure is not limited to one second, and the same effect is achieved as long as the air amount from the lamp cooling fan 95 is smaller than the air amount when the lamp 10 is turned off (an air amount of zero is also possible). The same effect is also achieved by cutting off (reducing) air blowing onto the lamp 10 with a component that intercept the air from the fan instead of stopping (reducing the number of rotations) of the lamp cooling fan.

EXAMPLE 3

Figure 8:
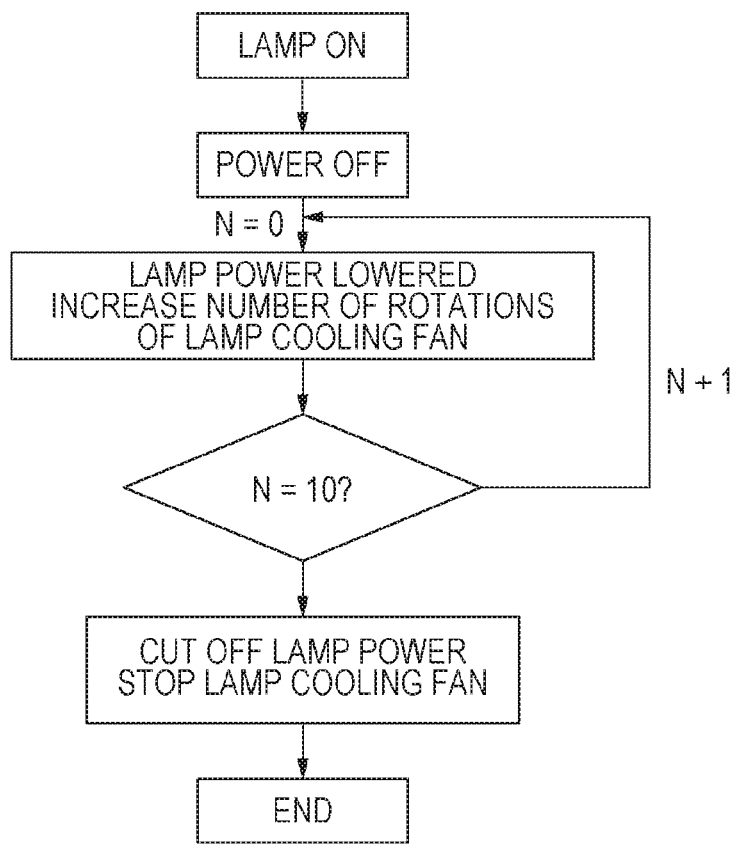
FIG. 8 is a flowchart of control of electric power of a lamp and a lamp cooling fan when the lamp is turned off, as in Example 3.

In the liquid crystal display apparatus 1, when the user performs the operation to cut the power source off, a sequence shown in FIG. 8 is First of all, electric power supplied from the power supply unit 16 to the lamp 10 is lowered. Simultaneously, control to increase the number of rotations of the lamp cooling fan 95 by the fan control device 98 is performed. (STEP 1) Electric power supplied from the power supply unit 16 to the lamp 10 is further lowered 1 second after again. Simultaneously, control to further increase the number of rotations of the lamp cooling fan 95 by the fan control device 98 is performed. (STEP 2) After performing the above-described operation 10 times repeatedly, electric power supplied from the lamp 10 by the power supply unit 16 is cut off. (STEP 3) By using this sequence, the cooling gradient of the temperature of the bulb 11 can be made gentle by controlling electric power supplied to the lamp 10 and a change of the cooling performance of the lamp cooling fan 95. In other words, the supply power from the power supply unit 16 is lowered (little by little) by a plurality of times and, simultaneously, the supply power to the lamp cooling fan 95 is increased (little by little) by a plurality of times. Specifically, electric power from the power supply unit 16 is lowered by 3 to 5% of the normal electric power, and supply power to the lamp cooling fan 95 is increased by 3 to 5% of the supply power to the lamp cooling fan 95 at the time of normal image display.

Figure 9:
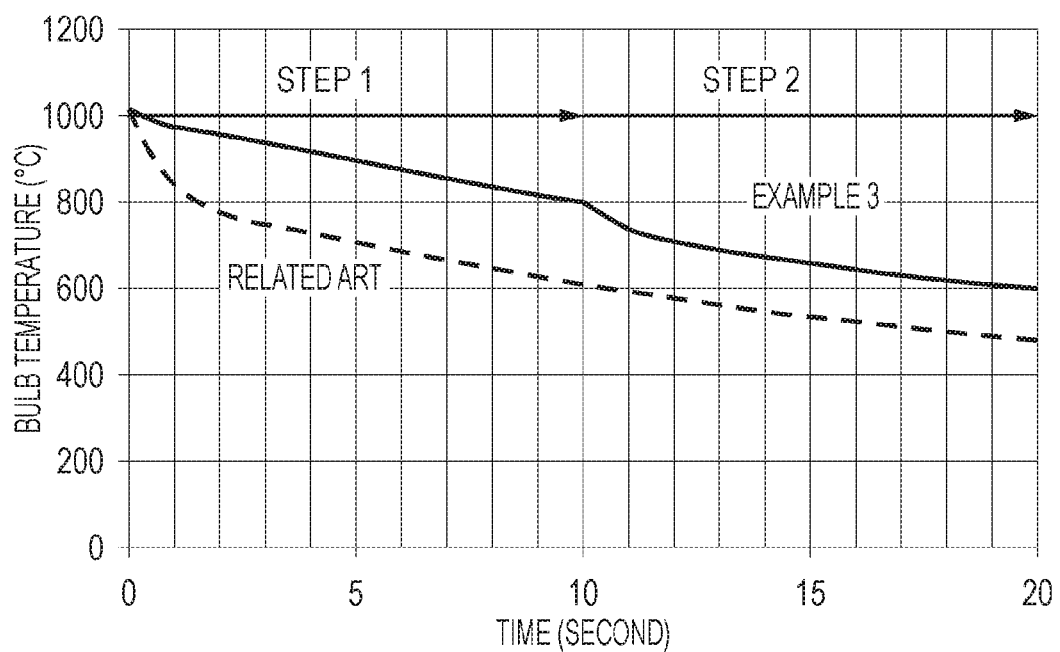
FIG. 9 illustrates a change in bulb temperature when the lamp is turned off, as in Example 3.

By introducing the turn-off sequence shown in FIG. 8, the temperature of the bulb 11 of the lamp 10 when the lamp is turned off can be made gentle as shown in FIG. 9. Consequently, the cooling gradient to the distortion point of quartz glass can be made gentle, and hence probability of occurrence of the failure of the lamp 10 may be reduced.

In this disclosure, the number of steps of switching electric power supplied to the lamp 10 and the number of rotations of the lamp cooling fan 95 are described as ten times. However, the effect of this disclosure is not limited thereto, and the same effect is achieved as long as the number of steps of switching is two or more. The electric power of the lamp 10 and the number of times of switching of the number of rotations of the lamp cooling fan 95 do not have to be the same, and what is important is that the temperature gradient until reading the distortion point of quartz glass is set to be minimum against the failure of the lamp 10.

Although the embodiment of this disclosure have been described, this disclosure is not limited to the image display apparatus of the embodiment, and various modifications or variations may be made within the scope of this disclosure. For example, this disclosure is also applicable to optical equipment using a light source other than the above-described control program, control method, or the image display apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image display apparatus comprising:
a light source:
a light source control unit configured to control electric power to be supplied to the light source:
a cooling control unit configured to control electric power to be supplied to a light source cooling unit to control a cooling performance of the light source cooling unit;
an image display device; and
an illumination optical system configured to guide light from the light source to the image display device,
wherein when the light source control unit turns off the light source, the light source control unit is configured to firstly lower electric power to be supplied to the light source to a predetermined electric power that is lower than normal electric power to be supplied when the light source is on, and then to cut off the electric power to be supplied to the light source, and
wherein when the light source control unit turns off the light source, the cooling control unit makes cooling performance of the light source cooling unit higher than the cooling performance when the normal electric power is supplied to the light source,
wherein after the light source control unit lowers the electric power to be supplied to the light source to the predetermined electric power, an interval of one second or more is provided until the cooling control unit cuts off the electric power to be supplied to the light source cooling unit, and
wherein an interval of one second or more is provided until the light source control unit cuts off the electric power to be supplied to the light source, after the cooling control unit cuts off the electric power to be supplied to the light source cooling unit.

2. The image display apparatus according to claim 1, wherein when the light source is turned off, electric power that the cooling control unit supplies to the light source cooling unit is not lower than 1.3 times and not higher than 5 times electric power when the light source control unit supplies normal electric power to the light source.

3. The image display apparatus according to claim 1, wherein when the light source is turned off, the electric power that the light source control unit supplies to the light source is lowered to predetermined electric power which corresponds to electric power of not lower than 50% of the normal electric power to be supplied when the light source is on, and then the electric power to be supplied to the light source is cut off.

4. The image display apparatus according to claim 3, wherein the predetermined electric power is not lower than 60% and not higher than 80% of the normal electric power to be supplied when the light source is on.

5. The image display apparatus according to claim 3, wherein when the light source is turned off, the light source control unit changes the electric power to be supplied to the light source a plurality of times to cut off the electric power to be supplied to the light source.

6. The image display apparatus according to claim 3, wherein a period during which the light source control unit maintains the predetermined electric power is one second or more.

7. The image display apparatus according to claim 1, wherein a temperature of the light source when the light source control unit cuts off the electric power to be supplied to the light source is not higher than a strain point of glass which comprises a bulb of the light source.

8. The image display apparatus according to claim 1, wherein an absolute value of a temperature gradient of the light source from a start of turn-off operation of the power source until cut-off of the electric power to be supplied to the light source is lower than 20° C./s.

9. The image display apparatus according to claim 1, further comprising:
a turn-off operation member configured to turn off the light source,
wherein a turn-off operation of the light source is started after the turn-off operation member is operated.

10. The image display apparatus according to claim 1, wherein the light source is an ultra-high pressure mercury lamp.

11. A control method for controlling an image display apparatus including a light source, a light source control unit configured to control electric power to be supplied to the light source, a cooling control unit configured to control electric power to be supplied to a light source cooling unit to control a cooling performance of the light source cooling unit, an image display device, and an illumination optical system configured to guide light from the light source to the image display device, the control method comprising: lowering the electric power to be supplied to the light source to a predetermined electric power that is lower than normal electric power to be supplied when the light source is on, when the light source is turned off; cutting off electric power to be supplied to the light source to turn off the light source, after lowering the electric power to be supplied to the light source; making cooling performance of the light source cooling unit higher than the cooling performance when the normal electric power is supplied to the light source; and providing an interval of one second or more after making the cooling performance of the light source cooling unit higher, and cutting off the electric power to be supplied to the light source cooling unit, wherein an interval of one second or more is provided until the electric power to be supplied to the light source is cut off, after the electric power to be supplied to the light source cooling unit is cut off.

12. A non-transitory computer readable storage medium configured to store computer executable instructions for causing a computer to execute a control method for controlling an image display apparatus including a light source, a light source control unit configured to control electric power to be supplied to the light source, a cooling control unit configured to control electric power to be supplied to a light source cooling unit to control a cooling performance of the light source cooling unit, an image display device, and an illumination optical system configured to guide light from the light source to the image display device, the control method comprising: lowering the electric power to be supplied to the light source to a predetermined electric power that is lower than normal electric power to be supplied when the light source is on, when the light source is turned off; cutting off electric power supply to the light source to turn off the light source, after lowering the electric power to be supplied to the light source; making cooling performance of the light source cooling unit higher than the cooling performance when the normal electric power is supplied to the light source; and providing an interval of one second or more after making the cooling performance of the light source cooling unit higher, and cutting off the electric power to be supplied to the light source cooling unit, wherein an interval of one second or more is provided until the electric power to be supplied to the light source is cut off, after the electric power to be supplied to the light source cooling unit is cut off.

* * * * *